United States Patent Office 3,296,331
Patented Jan. 3, 1967

3,296,331
LIQUID PHASE POLYMERIZATION OF OLEFINS USING A ZINC FLUORIDE-ALUMINA CATALYST
Stephen M. Kovach, Highland, Ind., assignor to Sinclair Research, Inc., Wilmington, Del., a corporation of Delaware
No Drawing. Filed Aug. 24, 1962, Ser. No. 219,107
3 Claims. (Cl. 260—683.15)

This invention relates to a process for the selective polymerization of olefins to polymers whose molecular weights correspond to multiple units of the olefin and in particular, the olefin tetramer, pentamer and hexamer. Specifically, the present invention is directed to the selective polymerization of olefins containing 3 to 12 carbon atoms, and particularly to the selective polymerization of olefins containing 3 and 4 carbon atoms.

Olefins can be polymerized over known polymerization catalysts such as phosphoric acid to yield polymers of varying molecular weight. For instance, in propylene polymerization the propylene dimer and trimer fractions are utilized in motor gasoline and propylene tetramer and tridecene as alkylating agents in the manufacture of alkylaryl detergents. The tetramer and tridecene are actually composed of olefin polymers with varying molecular weights which give an average carbon number of $C_{12}$ and $C_{13}$, respectively. Processing propylene under typical commercial conditions (vapor-phase) over one of the common commercial catalysts, e.g. a calcined composite of phosphoric acid on kieselguhr, liquid phosphoric acid film on quartz, liquid acids such as phosphoric, sulfuric, etc.; however, yields a non-descript product containing olefin polymers in the molecular weight range of $C_7$ through $C_{20}$ and contains substantial amounts of intermediate molecular weight olefin polymers.

The trend in alkylaryl detergent manufacture is currently towards the use of higher molecular weight olefins such as the tetramers and hexamers. Unfortunately, the yield of high molecular weight olefins is low over commercial catalysts such as phosphoric acid on kieselguhr and necessitates recycle operation. In propylene polymerization one does not obtain the selective polymerization of propylene to the pentamer and hexamer. Many other catalyst systems investigated in the vapor-phase polymerization of propylene afford no better product distribution and yield than obtained from use of the phosphoric acid on kieselguhr catalyst.

A process has now been discovered whereby $C_3$ to $C_{12}$ olefins, particularly the $C_3$ to $C_4$ olefins can be polymerized to high selective yields of the dimer, trimer, tetramer, pentamer, hexamer and high homologues with high conversions of olefin. Moreover, the liquid olefin products of this process correspond to an unusually large extent in molecular weights to multiple units of the olefin, that is, there is a substantial reduction in intermediate molecular weight olefin polymers, and preferably the product contains little if any intermediate molecular weight olefin polymers.

In accordance with the process of the present invention the olefin is polymerized over a select catalyst containing fluoride and alumina while employing a particular set of operating conditions. To obtain the desired results, it is important that the conditions of temperature and pressure employed in the process be such that the olefin remains essentially in the liquid phase. This necessitates maintaining processing temperatures below the critical temperature of the olefin, for instance in the polymerization of propylene a temperature of about 198° F., and operating pressures above the vapor pressure of the olefin at the processing temperature under essentially anhydrous conditions. In the polymerization convenient reaction temperatures are below about 200° F., for instance about 0 to 197° F., for propylene, preferably about 70 to 180° F., and the pressure often ranges from about 0 to 2000 p.s.i.g., preferably about 200 to 800 p.s.i.g. Space velocities in the range of about 0.1 to 20 LHSV (Liquid Hourly Space Velocity) have been found suitable but a space velocity of about 0.1 to 10 LHSV is preferred. Polymerization over a zinc fluoride on alumina catalyst or a fluoride alumina catalyst often yields a product containing propylene trimer, tetramer and pentamer with at least 35% by weight of the product boiling above propylene tetramer. The desired polymer fraction can be recovered from the liquid olefin product by any suitable means such as fractionation.

Due to the exothermicity of the polymerization reaction and the narrow temperature operating range, it is preferred to employ internal means as heat sinks. This can be accomplished for instance by employing inert hydrocarbon and catalyst diluents. The catalyst diluents are solid and the hydrocarbon diluents are liquid at the reaction conditions. The hydrocarbon diluent can be any hydrocarbon, unable to undergo polymerization, condensation, alkylation, etc. under the process conditions. This would encompass paraffins, naphthenes, highly substituted aromatics, etc. The preferred inert hydrocarbon diluent is propane. The inert hydrocarbon diluent reduces the concentration of olefin in the liquid phase and at the catalyst surface and often acts as a heat sink. If aromatics are used as a diluent, benzene, toluene, xylene and other mono- and (di-substituted) aromatics are undesirable since they may undergo alkylation with the olefin under the mild conditions required for selective polymerization. The aromatic solvent should be non-alkylatable under the conditions utilized, i.e. they should be highly substituted as for instance tri or tetra or more substituted benzenes. The choice of solvent will depend on factors such as the olefin feed, etc. which tend to maximize polymerization and minimize alkylation. Suitable inert catalyst diluents are any materials not supporting the polymerization, e.g. tabular alumina and material similar to that found in Table III, below, nor which destroy the polymerization activity of the catalyst. The amount of liquid diluent may be present in the range of about 0 to about 10 or more, preferably about 0.5 to 2, volumes of diluent to about 1 volume of the olefin. The solid diluent may be present in a volume ratio of about 0 to about 10, preferably about 1 to 3, volumes of the solid diluent to about 1 volume of the catalyst. In addition, external sources of cooling may be utilized such as circulating cold water, cold feed, air, etc.

The catalyst of the present invention is an alumina base catalyst containing fluorine. The fluorine can be present in the catalyst in the form of the ion, per se and in combinations such as a metal fluoride, e.g. zinc or aluminum fluoride, fluosilicic acid, boria-fluoride, etc. The fluorine and boria components can for instance be provided by the addition of a fluoborate. The fluorine promoter is present on the alumina support in catalytically effective amounts. Generally this amount will fall within the range of about 1 to 20% by weight, preferably about 3 to 15% by weight. The catalyst support of the present invention is an activated or a gamma family alumina, e.g. gamma, eta, etc., such as those derived by calcination of amorphous hydrous alumina, alumina monohydrate, alumina trihydrate or their mixtures. The catalyst base most advantageous is a mixture predominating, for instance, about 65 to 95 weight percent, in one or more of alumina (trihydrates), i.e. bayerite I, bayerite II, (randomite or norstrandite), or gibbsite, and about 5 to 35 weight percent of alumina monohydrate (boehmite), amorphous hydrous alumina or their mixture. The alumina support can contain small amounts of a solid oxide such as silica, magnesia, activated clays (such as kaolinite, montmorillonite, halloysite, etc.), titania, zirconia, etc. or their mixtures.

The catalysts can be prepared by impregnation using a water-soluble compound of the catalytic component or by precipitation methods well known to the art. The fluorine can be added to the catalyst base in any stage of its preparation; for instance before or after it has been formed by tabletting or extrusion and calcined. After fluorine addition the catalyst can be calcined. In the case of fluoride alumina, the fluorine is commonly added through the use of a water-soluble fluoride compound. Although ammonium fluoride is generally preferred over water-soluble fluoride compounds, for example, ammonium fluosilicate, ammonium fluoborate, hydrofluosilic acid, hydrofluoric acid and the like can be employed.

To further illustrate the process of the present invention and demonstrate the importance of operating in the liquid phase as opposed to the vapor phase, Example I is included.

EXAMPLE I

Propylene was polymerized in the liquid phase over the catalysts of the present invention. For comparison, runs were also made in the vapor phase over the catalysts. The specific conditions employed and the results obtained are shown in Table I below. Runs 1 and 3 represent vapor-phase operations and runs 2 and 4 liquid phase operations.

*Table I*

|  | 12% $ZnF_2 \cdot Al_2O_3$ | | $Al_2O_3 + 3\%F\theta$ | |
| --- | --- | --- | --- | --- |
| Run | 1 | 2 | 3 | 4 |
| Conditions: | | | | |
| Temperature, °F | 215 | 90 | 210 | 80 |
| Peak Temp., °F | 340 | 155 | 427 | 135 |
| Pressure, p.s.i.g. | 850 | 800 | 800 | 800 |
| LHSV | 2 | 1 | 8 | 1 |
| $C_3^=$ Conversion | 76 | 65 | 68 | 78 |
| Wt. Percent Product: | | | | |
| $C_6^=$ (i–270° F.) | 10 | 1 | 13 | 3 |
| $C_9^=$ (270–290° F.) | 4 | 19 | 9 | 23 |
| 290–350° F | 7 | 3 | 10 | 3 |
| $C_{12}^=$ (350–390° F.) | 5 | 24 | 12 | 19 |
| 390–440° F | 12 | 4 | 10 | 3 |
| $C_{15}^=$ (440–480° F.) | 8 | 15 | 12 | 12 |
| 480° F.+ | 54 | 34 | 34 | 37 |

The data show that in runs 1 and 3 which were made in the vapor phase, large amounts of the product lay intermediate to the propylene trimer, tetramer and pentamer ranges. In contrast, the product of runs 2 and 4 made in the liquid phase, lay principally within the boiling range for propylene trimer, tetramer and pentamer with only a small amount of boiling intermediate these materials. If one were to plot overhead temperature vs. volume percent overhead for the catalysts of the present invention, it would be seen that in the vapor-phase run a straight line or nearly constant slope is obtained on plotting distillation temperatures and overhead. Plotting the distillation data from the liquid phase run yields plateaus corresponding to propylene trimer, tetramer and pentamer.

Examples II and III are included to illustrate the importance of employing the defined catalysts in the process of the present invention.

EXAMPLE II

Propylene polymerizations were conducted under the conditions shown in Table II below, employing the following catalysts: 12% $ZnF_2$ on $Al_2O_3$, $ZnF_2$ alone and $Al_2O_3$ alone. The conversion obtained with each catalyst is shown in Table II.

*Table II*

CONDITIONS: 80° F., 800 p.s.i.g., 1 LHSV

| Run | 4 | 5 | 6 |
| --- | --- | --- | --- |
| Catalyst | 12%$ZnF_2 \cdot Al_2O_3$ | $ZnF_2$ | $Al_2O_3$ Base. |
| $C_3^=$ Conversion | 65 | 0 | 6. |

The data of Table II show that the alumina support and zinc fluoride when employed alone showed little or no activity towards the selective polymerization of propylene in the liquid phase. However, incorporating zinc fluoride on the alumina yielded an excellent catalyst for selective polymerization.

EXAMPLE III

Various catalysts identified in Table III and known to be active for the vapor phase polymerization of propylene, were employed in propylene polymerizations under the liquid phase conditions shown in Table III. The propylene conversion obtained with each catalyst is also shown in Table III.

*Table III*

CONDITIONS: 75° F., 800 p.s.i.g., 1 LHSV

| Run | 10 | 11 | 12 | 13 | 14 | 15 |
| --- | --- | --- | --- | --- | --- | --- |
| Catalyst | 88% $SiO_2$-12% $Al_2O_3$. | 88% $SiO_2$-12% $Al_2O_3$. | $SiO_2$-MgO | $TiO_2$-$Al_2O_3$ | $H_3PO_4$ kieselguhr Poly Cat. | Amberlyst #15 Resin. |
| $C_3$ Conversion | 0 | 0 | 0 | 0 | 0 | 0. |

The data of Table III demonstrate that although the catalyst may be active for the vapor-phase polymerization of propylene, they show no activity under the conditions of the present invention.

EXAMPLE IV

These runs show that the choice of solvent may affect the polymerization reaction that that for proper polymerization of the olefin the choice of the solvent may depend on the olefin feed.

*Table IV*

[Catalyst: 12% $ZnF_2 \cdot Al_2O_3$]

| Run | 7 | 8 |
| --- | --- | --- |
| Feed: | | |
| Aromatic | m-Xylene | Toluene. |
| Olefin | Isobutylene | Propylene. |
| Arom/olefin (m./m.) | 2.3/1 | 2/1. |
| Tabular $Al_2O_3$/Cat. (v./v.) | 1/1 | 1/1. |
| Conditions: | | |
| Temp., °F | 80 | 80. |
| Peak Temp., °F | 112 | 135. |
| Pressure, p.s.i.g | 800 | 800. |
| LHSV | 1 | 1. |
| Olefin Conversion | 100 | 100. |
| Percent Alkylation | 9 | 100. |
| Percent Polymerization | 91 | Nil. |
| Wt. Percent Polymer: | | |
| $C_6^=$ | | |
| $C_8^=$ | | |
| $C_9^=$ | | |
| $C_{12}^=$ | 49 | |
| $C_{15}^=$ | | |
| $C_{16}^=$ | 16 | |
| $C_{18}^=$ | | |
| $C_{20}^=$ | 34 | |
| $C_{24}^=$ | | |

The catalyst of the present invention possesses unique fouling and regenerating features. By operating at low temperatures (at room temperatures) these catalysts become deactivated not by carbon laydown on the catalyst but lose activity by the plugging of the catalyst pores by heavy polymeric material. Polymerization activity can be restored, however, by washing the catalyst with a suitable paraffin or aromatic hydrocarbon solvent as, for instance, n-pentane or benzene. If solvent washing fails, reactivation can be brought about by heat-treating the catalyst to 400 to 700° F. and purging with an inert gas such as nitrogen. This high temperature purge drives the heavy polymeric material out of the pores of the catalyst depositing only a small amount of carbon on the catalyst without loss in polymerization activity.

It is claimed:

1. A process for the selective polymerization of an olefin selected from the group consisting of propylene and isobutylene to polymers whose molecular weights correspond to multiple units of said olefin which consists essentially of polymerizing said olefin in the liquid phase at a temperature of about 70 to 180° F. and a pressure of about 200 to 800 p.s.i.g. in contact with a catalyst consisting essentially of a catalytic amount of about 1 to 20% by weight zinc fluoride supported on activated alumina.

2. The process of claim 1 wherein the olefin is propylene.

3. The method of claim 2 wherein the amount of zinc fluoride on the alumina support is about 3 to 15% by weight.

References Cited by the Examiner
UNITED STATES PATENTS

| | | | |
|---|---|---|---|
| 2,404,788 | 7/1946 | Burk et al. | 260—683.15 |
| 2,406,869 | 9/1946 | Upham | 260—683.15 |
| 2,487,978 | 11/1949 | Murray | 260—683.15 |
| 2,657,245 | 10/1953 | Davidson | 260—683.15 |
| 2,830,106 | 4/1958 | Good et al. | 260—683.15 |

PAUL M. COUGHLAN, Jr., *Primary Examiner.*

DANIEL E. WYMAN, *Examiner.*